United States Patent
Jacobs et al.

(10) Patent No.: US 7,962,596 B2
(45) Date of Patent: Jun. 14, 2011

(54) AUTOMATED PROVISIONING SYSTEM

(75) Inventors: David Jacobs, London (GB); Philip Rimell, London (GB); Paulo Pinto, London (GB); Keith Sterling, London (GB); Jordan Wensley, London (GB)

(73) Assignee: Jacobs Rimell Limited, London (GB)

( * ) Notice: Subject to any disclaimer, the term of this patent is extended or adjusted under 35 U.S.C. 154(b) by 581 days.

(21) Appl. No.: 11/984,453

(22) Filed: Nov. 19, 2007

(65) Prior Publication Data

US 2008/0133734 A1    Jun. 5, 2008

Related U.S. Application Data

(63) Continuation of application No. 09/602,024, filed on Jun. 23, 2000, now Pat. No. 7,313,611.

(30) Foreign Application Priority Data

Jun. 25, 1999   (GB) .................................. 9914974.2

(51) Int. Cl.
*G06F 15/173* (2006.01)
(52) U.S. Cl. ...................................................... 709/223
(58) Field of Classification Search .................... 709/223
See application file for complete search history.

(56) References Cited

U.S. PATENT DOCUMENTS

| | | | |
|---|---|---|---|
| 5,491,817 A | 2/1996 | Gopal et al. | 707/200 |
| 5,774,552 A | 6/1998 | Grimmer | 713/156 |
| 5,864,866 A | 1/1999 | Henckel et al. | |
| 5,870,667 A | 2/1999 | Globuschutz | 455/419 |
| 6,009,103 A | 12/1999 | Woundy | 370/401 |
| 6,028,605 A | 2/2000 | Conrad et al. | 345/840 |
| 6,044,403 A | 3/2000 | Gerszberg et al. | 709/225 |
| 6,052,724 A | 4/2000 | Willie et al. | 709/223 |
| 6,067,548 A | 5/2000 | Cheng | 707/103 R |
| 6,085,030 A * | 7/2000 | Whitehead et al. | 709/203 |
| 6,085,188 A | 7/2000 | Bachmann et al. | 707/3 |
| 6,088,796 A | 7/2000 | Cianfrocca et al. | 713/152 |
| 6,101,541 A | 8/2000 | Ellesson et al. | 709/225 |
| 6,105,066 A | 8/2000 | Hayes, Jr. | 709/226 |
| 6,108,691 A | 8/2000 | Lee et al. | 709/206 |
| 6,122,258 A | 9/2000 | Brown | 370/256 |
| 6,157,953 A | 12/2000 | Chang et al. | 709/225 |
| 6,192,405 B1 | 2/2001 | Bunnell | 702/225 |
| 6,209,036 B1 | 3/2001 | Aldred et al. | 709/229 |
| 6,216,104 B1 | 4/2001 | Moshfeghi et al. | 704/260 |
| 6,233,582 B1 | 5/2001 | Traversat et al. | 707/102 |
| 6,243,816 B1 * | 6/2001 | Fang et al. | 726/5 |
| 6,314,555 B1 | 11/2001 | Ndumu et al. | 717/101 |

(Continued)

FOREIGN PATENT DOCUMENTS

EP    0 793 179    9/1997

(Continued)

OTHER PUBLICATIONS

D. Chadwick, Understanding X.500—The Directory, 1994, 29 pages.

*Primary Examiner* — J Bret Dennison
(74) *Attorney, Agent, or Firm* — Zilka-Kotab, PC

(57) ABSTRACT

A computer system comprising a number of components which make up an infrastructure with the system having a Directory 10 and an APS which is adapted to centralize and automate information management for online service systems.

14 Claims, 8 Drawing Sheets

U.S. PATENT DOCUMENTS

| | | | |
|---|---|---|---|
| 6,321,259 B1 | 11/2001 | Ouellette et al. | 709/220 |
| 6,330,586 B1 | 12/2001 | Yates et al. | 709/201 |
| 6,334,114 B1 | 12/2001 | Jacobs et al. | 705/26 |
| 6,343,287 B1 | 1/2002 | Kumar et al. | 707/4 |
| 6,385,644 B1 | 5/2002 | Devine et al. | 709/206 |
| 6,389,589 B1 | 5/2002 | Mishra et al. | 717/170 |
| 6,424,968 B1 | 7/2002 | Broster et al. | 707/3 |
| 6,442,547 B1 | 8/2002 | Bowman-Amuah | 707/10 |
| 6,470,332 B1 | 10/2002 | Weschler | 707/3 |
| 6,539,077 B1 | 3/2003 | Ranalli et al. | 379/67.1 |
| 6,542,515 B1 | 4/2003 | Kumar et al. | 370/463 |
| 6,549,952 B1 | 4/2003 | Plassmann et al. | 719/311 |
| 6,594,763 B1 | 7/2003 | Madoukh | 713/200 |
| 6,643,690 B2 | 11/2003 | Duursma et al. | 709/217 |
| 6,687,746 B1 | 2/2004 | Shuster et al. | 709/223 |
| 6,721,713 B1 | 4/2004 | Guheen et al. | 705/1 |
| 7,133,846 B1 | 11/2006 | Ginter et al. | 705/54 |
| 7,165,174 B1 | 1/2007 | Ginter et al. | 713/153 |
| 7,185,073 B1 | 2/2007 | Gai et al. | 709/221 |
| 7,346,697 B2 * | 3/2008 | Zhang et al. | 709/230 |
| 2002/0032763 A1 | 3/2002 | Cox et al. | 709/223 |
| 2003/0030662 A1 | 2/2003 | Poisson et al. | 345/735 |
| 2003/0105955 A1 | 6/2003 | Carroll et al. | 713/156 |

FOREIGN PATENT DOCUMENTS

| | | |
|---|---|---|
| EP | 0 834 807 | 4/1998 |
| EP | 0 955 761 A1 | 2/1999 |
| EP | 0 949 788 | 10/1999 |
| EP | 1 026 867 A2 | 12/1999 |
| EP | 1 039 724 | 9/2000 |
| JP | 8-65395 | 3/1996 |
| WO | WO 99/28827 | 6/1999 |
| WO | WO 99/33228 | 7/1999 |
| WO | WO 00/57296 | 9/2000 |
| WO | WO 00/78004 | 12/2000 |

* cited by examiner

AUTOMATED PROVISIONING SYSTEM

This application is a continuation of U.S. Ser. No. 09/602,024, filed Jun. 23, 2000 now U.S. Pat. No. 7,313,611, the disclosure of which is incorporated herein by reference.

BACKGROUND OF THE INVENTION

The invention relates generally to an Automated Provisioning System (APS system) which is adapted to centralize and automate information management for online services.

When new personnel or users are first allowed access onto an online service, which may be provided by service providers such as Telecommunications Companies (Telcos), corporations or enterprises, for example businesses or offices having their own internal online services, the new personnel or users have to go through a registration routine in order to enable them to use the online service. The registration routine involves the new user providing information, such as an identity code, to a central point so that each time the user logs onto the service, then their details are verified and the user is permitted by means of an appropriate identity code, to access pre-defined parts of the service. The user on registration will have been given permission to access certain parts of the online system according to the level of access that they require. For the customer of a service provider the level of access will be determined by the service that has been assigned as a result of completing an online registration form. For example a customer responds to a promotion that has been distributed by a service provider and registers for the online service via the internet. For an employee of a company the level of access may be determined by their position in a company and the work that they are required to perform. For example, the managing director of a company is likely to be allowed access to all services, ranging from accounting, to personnel and company strategy. In contrast a secretary may have access only to services or information that he needs to actually work on and will be denied access to other parts of the online services system.

Further, in organizations which are located on a number of office sites, it may be necessary on registration to specify the exact location of that employee within the organisation, for example if they are located at site A or site B because the employee will be registered as using a particular computer terminal at a particular site. However, if that employee is relocated in the organisation and is moved to another office site, a re-registration procedure must take place to take account of that relocation to another office and terminal. This means that on relocation, there will be a delay in the individual recommencing work as a result of the need for there to be a re-registration procedure to enable the individual to use the computer network once they have moved. This will result in a reduction of the efficiency of the individual, which in turn will reduce the productivity of the organisation. Further, with such systems it is necessary to have a department in the organisation which is dedicated to the manual input of data about individuals in that organisation that are using the computer network and where those individuals are located. Also a system has to be set up to track and monitor the movement of individuals in the organisation, and the costs associated with such departments and tracking systems, with the increase in personnel needed, increases the costs of running a computer network within an organisation.

Accordingly, there is a need for an APS system which facilitates the rapid deployment of new entities onto an online service, which may be an individual or a piece of infrastructure such as network hardware e.g. switches and workstations, and software e.g. firewalls, operating systems and mail servers. Further there is a need to reduce costs and improve efficiency by the removal of the manual assignment of registration and tracking processes. There is the need for the fast and reliable changes to infrastructure, together with the ability to expand and integrate existing systems with associated infrastructures. In turn, there is the need for the facility to consolidate distinct networks, say following an acquisition of another network by an organisation, e.g. after the merger of organizations. There is also the need for the automation of the tracking and registration of user entities from one internet protocol address to another, which may be controlled by a single logical repository for all entity information, thereby making the online service more user friendly, faster and more flexible to use.

Further, in service providers who are operating online services on behalf of other organizations there is the need to be able to manage each organization's information in a separate logical partition of the single information repository and apply branding to the administration and registration interfaces that are specific to each organisation. There is also the need for the systems that provide the online services to be able to determine the logical partition to be used within the single repository when authenticating and authorizing users to use the online services.

SUMMARY OF THE INVENTION

According to the present invention there is provided a n automated provisioning system adapted to use an LDAP or X.500 compatible directory enabled information repository, the system comprising a service manager adapted to interface with the information repository and components of a distributed electronic system, wherein the information repository comprises a scalable data model, wherein the service manager is adapted to log on to a directory and interacts therewith to create, delete, amend and/or search for information in the information repository, wherein the service manager is also adapted to interact, through a plurality of interfaces, with components and users of the distributed electronic system to enable authentication and authorization to use services running on the components.

In a preferred embodiment, the core components include an Administration Tool for creation of services and user domains and for the generation of reports and an Interface Manager (Story Processor™) for the registration of users of the online services and for the presentation and collection of information from administrators and that relate to the usage of the online services. Together the Service Manager, Administration tool and Interface Manager control the administration, entity registration and reporting functions of the system and can also extend control to include firewalls and application servers, such as mail servers and news servers. Even non-directory enabled infrastructure is supported with the use of a mediation function.

The APS system of the present invention may be used with infrastructures that support dial-in Internet users. This includes pools of modems, network access servers and Authentication Authorisation Accounting (AAA)/RADIUS servers. Internet Service Providers (ISPs), Network Service Providers and Application Service Providers (ASPs) rely on existing PSTN and ISDN infrastructures to allow dial-in users to connect to their NAS devices from homes and offices. The APS system of the present invention aims to provide a service based authentication and authorisation to use the system and provides a customizable user interface for subscriber registration, together with an administration/help desk. The administration interface allows the service providers to create, modify or delete the services that they provide as well as providing a fast-dial-up access to the internet. The APS system also seeks to provide for an automated on-line subscriber self-registration system via a web browser interface. Further the APS system aims to allow for the configuration or reconfiguration of infrastructures with new or modified subscriber settings according to the level of access that the subscriber requires and existing subscribers once registered with the service provider, can subscribe to new services or modify existing services or they can unsubscribe from services. Internet Protocol address assignment may be used to deliver differentiated qualities of service to different types of subscribers, for example there may be residential tiers, business tiers, corporate tiers which are defined according to the level of access required by the subscriber and the status of that subscriber or group of subscribers. The RADIUS server provides authentication and authorisation services using information that has been put in the Directory using the APS system to enable the subscriber to access the network and there may also be a provision for the automatic revocation of a service after a predefined period e.g. after the expiry of a subscription period to a service provider. The APS system seeks to support Virtual Private Networking (VPN), Virtual Portal and domain creation with multi-user administrator and help desk facilities. For each VPN, Virtual Portal and domain the APS will also apply specific branding to the administration and registration user interfaces.

The APS system of the present invention may also be used by cable TV companies. Cable companies possess a Hybrid Fibre Coaxial (HFC) infrastructure which delivers a high bandwidth communication link into a house, office or organisation and the cable connects to a splitter for shared access by multiple devices e.g. set-top boxes, telephones etc. A cable company may provide a multitude of different services to which customers may subscribe e.g. home shopping services, chat services, opinion polling services, news, movie, and sports channel services, call waiting, diversion and call barring services etc.

The APS system of the invention, in addition to the facilities it provides for Service Providers as discussed also aims to provide the assignment of cable modem IP addresses using Directory enabled DHCP or Directory enabled Bootstrap Protocol (BOOTP) and to assign cable modem boot files and appropriate TFTP servers to modems to retrieve boot configuration files. There is also the provision of a dynamic link between a cable modem, workstation and the subscriber which assists in the prevention of thefts from the service as the subscriber can be traced. Further the APS features include the provision of support for all MCNS compliant cable modems and as for the APS system, aims to allow for browsing and searching of the directory store.

The APS system of the invention aims to be fully extensible to satisfy specific business requirements, which can range from the inclusion of extra directory enabled server components such as RADIUS server components for an ISP, to an additional interface to support an existing or legacy system or workflow and billing systems. The APS system also aims to support an extensible scheme for adding new object types to an LDAP/X.500 directory as new types of network infrastructure are added.

Also, the APS can be used within enterprises such a corporations or offices or simply a network of users which provide intranet, extranet and remote access services to their workforce or users. Different roles within an enterprise may necessitate different service levels for staff and management. Consequently an APS system for an enterprise must include, in addition to the systems already discussed, rapid registration/deployment of new employees and the allocation of IP addresses via DHCP which can deliver differentiated dualities of service to differing communities of entities e.g. they may provide a home user entity tier or a remote office tier. There may be the provision for the automatic revocation of a service such as an IP address based on a defined policy, which may be as long as an employee remains in employment with the enterprise, for example contract workers. The APS features may also include web browser interfaces for access to information using the Interface Manager, including addresses in use by subnet, time in use per address, IP address to name assignment, inventory information per address and manual suspension and revocation of users and associated IP addresses.

The APS system of the present invention may also be used by companies for Internet services. Companies who offer products or services for sale over the Internet capture information from users regarding the products and services they require and the method of payment they wish to use. The information can be passed to an online billing system or to a system which will debit funds from their selected credit card company. The information will also be used to instruct a workflow system to dispatch the product to the individual or to instruct an online server to provide the required service.

DETAILED DESCRIPTION

Figure 1:
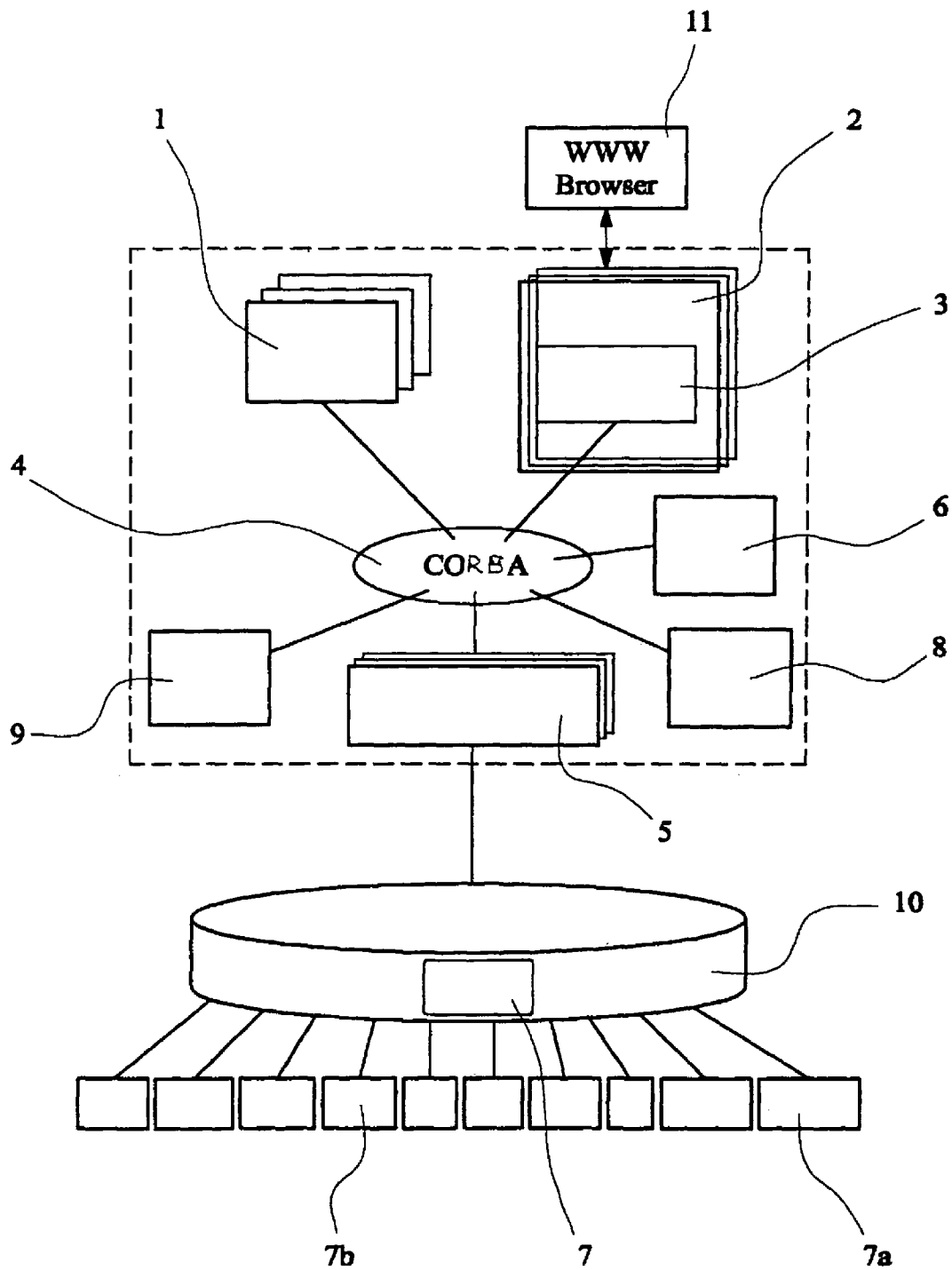
FIG. 1 illustrates the relationship between the Interface, Interface Manager, Web Server Service Manager and Directory of the APS system according to the invention.

The APS system of the invention comprises a range of components such as:
a. A Service Manager
b. Information Association GUI components
c. Information repository components, for example, X.500 Directories which include Open Directory DX Servers, LDAP servers such as Netscape Directory Servers, and Proprietary Directories such as Microsoft Active Directories.
d. An Interface Manager
e. A Trigger Server
f. A Report Server
g. A Cookie Server h. Infrastructure components which include;
   DHCP servers
   DNS servers
   RADIUS/AAA servers
   Cable Modem Head End
   Cable TV Head End
   Application servers such as Mail servers or News servers
   Routers
   Traffic Shaping Devices
   Firewalls
   PABX
   Certificate Authorities The core APS component is the Service Manager as shown in FIG. 1, which manages and integrates the other components. The Service Manager 5 allows for different software interface components 7a and hardware components 7b to be developed which can communicate with the Service Manager. The Service Manager has a defined application programming interface (API) which allows customized client applications to be developed. The Interface Manager 3, will allow for high customization. The Service Manager 5 can interface with the Administration Interface 1 or the Interface Manager 3, which in turn can interface with the Web Server 2. Standard CORBA interfaces 4 allows for an industry standard distributed system, as well as a comprehensive inter-communications architecture and security system. The Service Manager 5 can include a directory communication layer which enables the Service Manager to work with multiple directories allowing for dealing with a number of aspects at any one time such as fail-over and load sharing of requests. The Service Manager can then in turn, be interfaced with the Directory 10. The service manager uses the Lightweight Directory Access Protocol (LDAP) 7 for communication with the Directory 10. The Service Manager 5, Administration tool 1, Interface Manager 3 and Directory 10 may all reside on distinct machines running any network operating systems that are supported by the APS. Native applications can be developed to run on machines that communicate directly with the Service Manager 5. The Directory 10 can exist on a distinct server and may not be situated in the same geographical location as the Service Manager 5.

An Administration tool 1, is a stand alone program that runs on a computer. The APS of the invention allows Application tool to make direct calls to the Service Manager 5, bypassing the Interface Manager 3, all together. The APS supports a range of interface mechanisms allowing direct access to the Service Manager 5 and where necessary encapsulates specific details within capabilities of the Interface Manager. This flexibility allows APS to easily accommodate new interface mechanisms, simply by plugging in a new Story Processor such as a HTML Browser 11, or an Applet Interface if the desired interface mechanism is unable to talk directly to the Service Manager 5.

The APS includes a Trigger Server 9 which causes operations such as business rules and workflow to be triggered once an action is logged on the system, for example it may include an interface to a legacy billing system which is used to collect and send printed bills to a customer as well as writing the information to the directory server.

The APS also includes a Report Server 8 which can carry out complex searches on the system and can report back information in a specific way according to the requirements of the individual requesting that information.

Also, a Cookie Server 6 is included which, holds values that are written to the browser 11 by the web server 2 when the Interface Manger 3 is run. The Cookie Server holds this information, for example a page number, as a reference point which the user can look for when resuming a piece of work on the system. The Cookie Server acts as a short term persistent store of up to 24 hours.

Also, the system may include Middleware which enables different types of software to communicate with each other. This is particularly useful as it enables hardware from one manufacturer which may be using a certain type of software to be interfaced with hardware from another manufacturer, which may be using another software system. The advantage of this system is that it allows systems to be built up from different pieces of hardware rather than having to have a system comprising universal pieces of hardware.

The APS is fully scalable and can support multiple Service Managers 5, multiple Web Servers 2 that are associated with user browsers. Browsers are usually the primary information management interfaces for the network system.

Horizontal Scalability caters for an increase in the size of the user base and as this increases, Service Managers can be added, with Web Servers being load balanced to handle the increased load. Alternatively, a single Service Manager can be used and it can use load balancing to make requests to multiple Directory System Agents.

The Service Manager may be configured in a high performance configuration to enable high throughput of user activity at peak network times and in situations where there are high user loads, for example more than 10000 registrations per day. The Service Manager 5 uses servlet technology where each individual request creates a separate thread of execution. This improves server efficiency via the use of light weight threading models and using faster in-process execution. The Interface Manager 3, handles peak loads of requests by queuing registration requests to the Service Manager 5 and as requests come into the server, they are first stored in a serialized format on the server. The queue of registration requests is then processed by the Service Manager that acts as a buffer, until there are no registration requests remaining.

The Service Manager can support password encryption schemes such as MD5, SHA, DES and can provide support for X.509 certificates. Authorisation may be a two layer mechanism required for a user-service and a service-infrastructure system. The benefits are that authorisation can be managed at a service level. The Service Manager ensures network security by supporting secure sockets throughout the system. CORBA implementations support SSL over IIOP thereby ensuring security between the CORBA 4 and the Service Manager 5. Leading browsers all support SSL capabilities.

The Service Manager 5 can support the notion of Fail over-DSA, which the Service Manager can revert to in the event of Directory/DSA failure. The Service Manager can support multiple Interface Managers that communicate with a single Service Manager and so if the Web Server 2 or Interface Manager 3 fails, the system will still be available. This arrangement allows for multiple Service Managers, each of which talks to one or more DSA. In the event of a Service Manager failing, the overall system will still operate using the Service Manager(s) that have not failed. If a Server fails as a result of load, hardware or software problems, no registration request will be lost because these requests are stored in a persistent form on the Server on which the Story Processor resides. When the Service Manager recovers from a failure or is restarted, it checks whether there are any pending registration requests and then processes them if necessary.

While the APS requires the presence of a Directory, such as a LDAP/X.500 directory, the system is vendor neutral which means that it can be used with a range of specific components from different manufacturers. The APS is extensible to the effect that if additional pieces of equipment are introduced to the infrastructure, such as software infrastructure 7a for example a firewall, application servers, DHCP BootP, DDNS and RADIUS or hardware infrastructures 7b such as Lan switches, Routers or Gateways, the components can integrate with the management of existing components.

The Directory 10 acts as an information repository for information such as information about entities which can be defined as any person or piece of infrastructure requiring access to a service and an entity's access to these resources is defined by its entity base profile plus extensions to that profile. Further information stored by the Directory 10 is information about profile policies, which is defined by the services that can be supplied by the network, information about the infrastructure components and about domain. Domains are logical partitions, or sub-trees of a single physical LDAP/X.500 directory that a remote organisation has devolved authority for. For example a corporate organisation, such as a multi-national bank may have its own VPD which controls all the administration of that organisation. Telcos can provide their own dial in services for organizations that do not wish to manage their own physical dial in infrastructure. In order to identify and authenticate the dial in user, the Telco verifies the users login details such as the user's username, password, calling number or called number against those stored in the domain for that user. Although the APS is responsible for hosting the domains of a user, administration of the domain can be taken on by the user if they wish and this is referred to devolved authority of the VPD.

Figure 2:
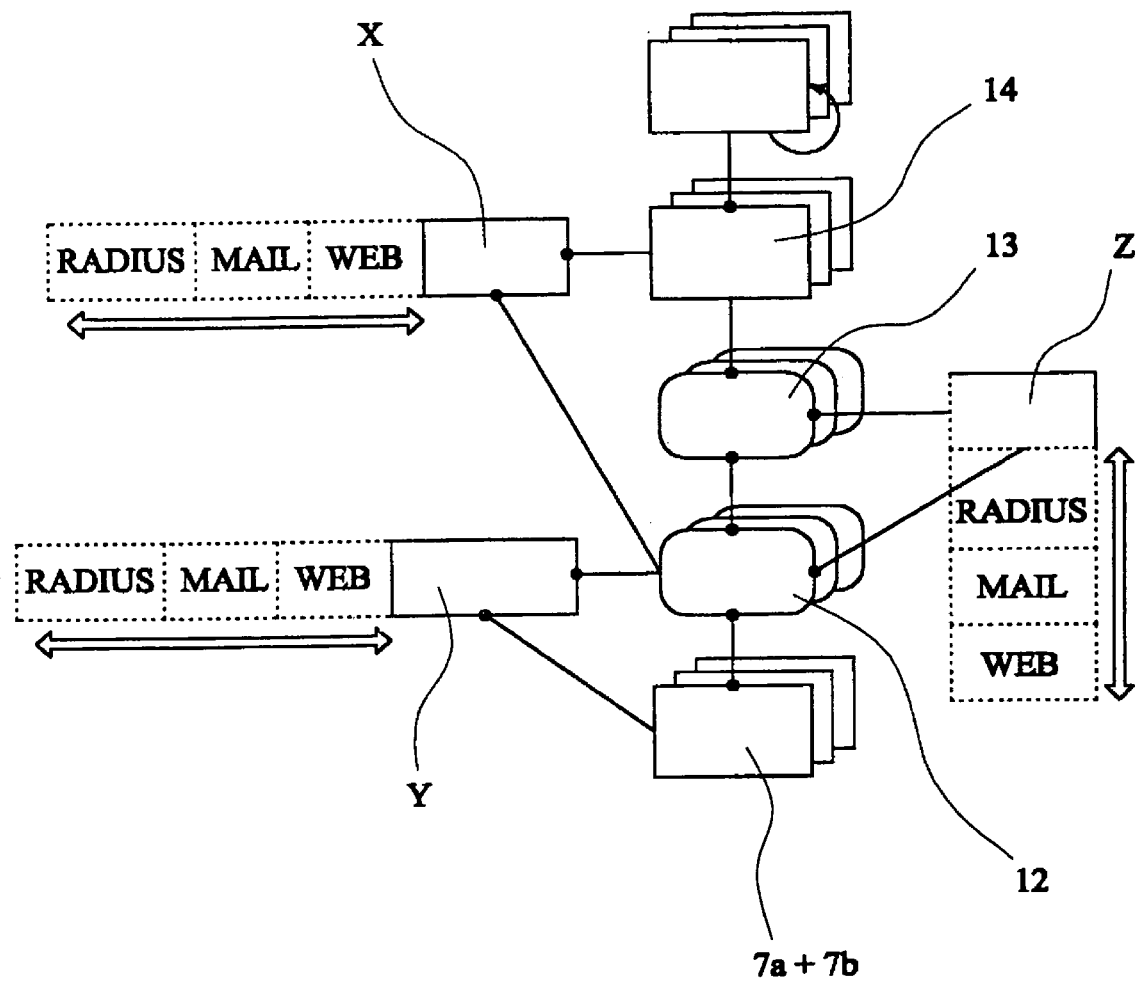
FIG. 2 illustrates how information is modeled and stored within the APS system.

FIG. 2 shows how the information is stored by the APS system. Users 14 are given specific profiles 13 according to the requirements that they have for using the system. Based on the profiles 13 that have been recorded for the user, that user will then have access to services 12 that are connected to the infrastructure, such as hard ware and software 7a and 7b of the system. The services 12, users 14, profiles 13 and infrastructure 7a,7b intercommunicate way of configuration objects such as the user to service configuration objects X, Profile to service configuration objects Z and service to infrastructure configuration objects Y. The user to service configuration object collates user service attributes provided by sub-class extensions of the user profile which represents user specific parameters which allow the user access to services such as the RADIUS username, RADIUS password, POP username and password i.e. the mail address and attributes and the WEB attributes which allow access to the Internet. The profile to service attributes set from the user profiles allow the user access to specific service parameters which can be used for functions such as marketing. There are again the RADIUS, Mail and WEB passwords which allow access to information such as lists and numbers of mailboxes of clients to which the user can send information e.g. for information about products. The service to infrastructure configuration object takes the service attributes provided by the sub class extensions and replaces the service parameters so allowing configuration between RADIUS, Mail and WEB attributes. This allows the infrastructure to find the service that is required by a user based on the profiles given for that user.

A user entity object will contain at least the user name, password, location of the entity, contact information, set of profiles for the entity and the authentication expiry. The profile attribute for an entity contains a reference to a base profile for an entity plus, and if applicable, one or more profile extensions. Each entity will have at least one profile and possible more.

The first profile in the entity's set of profiles is referred to as the base profile and additional profiles are known as profile extensions. A first profile may be a base profile for one entity but this first profile may also be a profile extension for another entity. It is the core characteristics of an entity which is described by the base profile. The profile extensions represent refinements to the services that can be made available to the entity. Profile extensions allow customization of the service that a particular entity receives, without having to create an entirely new profile for that entity and can best be conceptualized as fine tuning adjustments to the basic service level.

Entities are granted authorisation to use a service or services by their association with entity profiles i.e. services are not directly assigned to entities but rather profiles are assigned to entities. And at the same time, services are assigned to profiles. An entity profile is a list of one or more services which collectively defines a level of access to an infrastructure. These services become available to entities that are assigned the respective profile. A level of service may be nil where access to the service is to be denied.

A key benefit of using profiles is that there will typically be far fewer profiles than the number of entities, which will simplify the maintenance function of assigning services to entities. An example of an organizations entity profile may be as follows:

Pre-provisioned Entity Profile—includes unregistered entity services which provide provisional IP to un-provisioned or pre-provisioned entities allowing access to the registration domains only.

Basic User profile—Includes basic-user services e.g. mail service

Administration profile—Includes basic-user service and administration services, which provides administration rights to the APS system.

Mobility profile—Includes basic-user services and dial-in user services

Helpdesk profile—Includes basic-user services and query services]

Human Resource profiles—Includes basic-user services and administration services.

Figure 3:
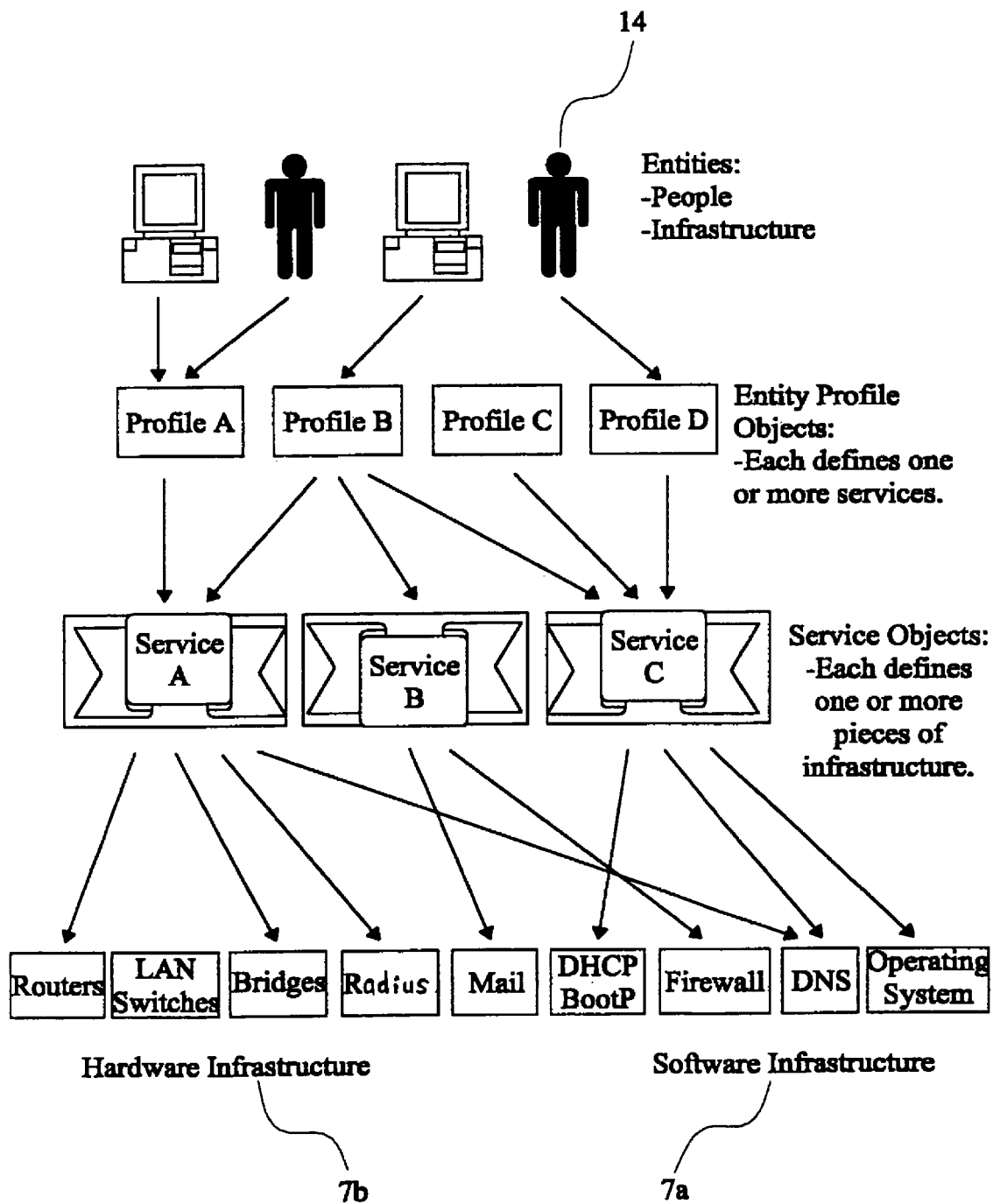
FIG. 3 illustrates the summation of base profiles plus profile extensions.

FIG. 3 demonstrates the logical summing of a base profile with an extension profile, to create a single virtual profile that is an aggregate of the two component profiles. However, there is one notable exception to this system and that is when two different profiles are in direct opposition to one another and in such a situation, the first occurrence in the set of profiles is the profile that takes precedence. Typically, this will be the base profile as it is the base profile that defines the core characteristics of the level of service that is to be provided for a user. If it is the intention of the network administrator to override the base profile, rather than to extend it, then the correct action would be to replace the base profile with the profile extension for that entity. The fact that an entity can have multiple profiles means that it is possible for the duplication of identical services to occur. This can be seen in FIG. 3, where both profiles C and A contain services 1 and 4. As these profiles are identical, they only occur once in the logical sum of the two profiles.

The logical summation of the individual profiles for a given entity is not stored within the directory store but a dynamic structure is held in the service manager. When an entity requests a service, the service manager looks up this logical set of services which was created preferably when the entity session begins, to establish whether the entity is authorised to gain access to that particular service.

The use of profile extensions gives rise to a maintenance function, whereby a network administrator can periodically check for patterns of use of a certain profile extension or extensions to enhance a given base profile, which could enable a user to gain access to further services that are offered on a network. A high frequency of use of a particular profile extension, combined with a particular base profile would suggest to the network administrator that a new base profile for an entity whose base profile it is, was required which would incorporate the previous base profile and the profile extension services that have been used. The administrator would then create a new base profile and apply it to the appropriate entities.

Services are the logical association of different pieces of infrastructure and/or existing services, which cooperate to provide the requirements of a particular entity. The infrastructure may be the network hardware such as routers, switches, workstations or any other type of hardware that the APS will manage. The infrastructure may also be applications such as firewalls, mail servers, operating systems or any other type of software that the APS system will manage.

The services may be abstracted from the physical infrastructure which provides the benefits of having a less complex system where in order to consider entity access the APS allows the system to consider the infrastructure in broad terms rather then in terms of each of the individual components. Also, the APS allows the system to recognize patterns in the infrastructure requirements by recognizing classes of entities. Further the APS allows for the separation of an entity maintenance role from that of the infrastructure maintenance role. The use of service inheritance also means that the task of creating new services is simplified because a network administrator may upgrade a new service by basing it on the old service and adding further pieces of infrastructure to compensate for the deficiencies in the old service that were noted by the network administrator. With service inheritance there is also the feature that a base service may not be deleted while there are services that are inherited from it. The system would scan existing services to ensure that there are no services which are inherited from a service to ensure that no files are deleted accidentally. The APS will enable an enterprise to create an infrastructure that is available to all employees by creating a single service called a "user service." Further a single level of service can be provided for all employees which is accessed by a single dial-in service. Further if an organisation has a router which allows access to the public domain, a service can be created such as a "gateway service" which relates to only a single or selected item of infrastructure. All other items can then be accessed separately via a "general user service". Also, where an organisation has a network administrator who wishes to take a hands-on approach to the allocation of network resources to entities and prefers to think in terms of infrastructure rather then in services, then a separate service can be created for each piece of infrastructure.

APS provides for the devolved authority of the Directory whereby a single directory may store information sub-trees for multiple organizations or sub-organizations which are provided with the facility to administer their own private logical portion of the physical directory tree, independently of the service provider. The APS provides domain administration tools. The APS allows the administration interface for the directory owner to create, modify or delete the logical domains from a single physical directory. Also the APS provides an administration interface whereby individual domain organizations or sub-organizations can administer their own domains. This includes interfaces to add, modify or delete users of a system or for reporting from the system. Further users of a given domain organization or suburbanization can also administer their own personal accounts, modify their service level and view their usage and accounting details.

The APS system allows for the assignment or preparation of resources for use by the entity to which the resources are associated. There are two types of association, firstly associating entities with services and secondly, associating services with infrastructure.

Entity to service association, also known as "immediate association" is the process whereby the service/services that are specifies in a given entity's base profile (plus any extensions of that profile) become available to an entity. This means that should an entity require services that are associated with a particular profile, then they have access to request those services. Entity to service association incorporates the steps of registration, which involves identification and authorisation of an entity, followed by authorisation for the entity to use services.

Registration is the process where an entity formally introduces itself to the APS system. In this process, entity details are gathered and stored within the directory store, where a unique entry is created in the directory for the entity. This stored information can then be quickly retrieved by the APS components. For example, a RADIUS server may wish to verify a username/password combination that has been received from a Remote Access Server (RAS) that a user of a telecommunications system has dialed into to request access to a company LAN. The RADIUS server retrieves the details relating to that user from the directory store and this includes the password that was specified by the user during the registration process.

Figure 4:
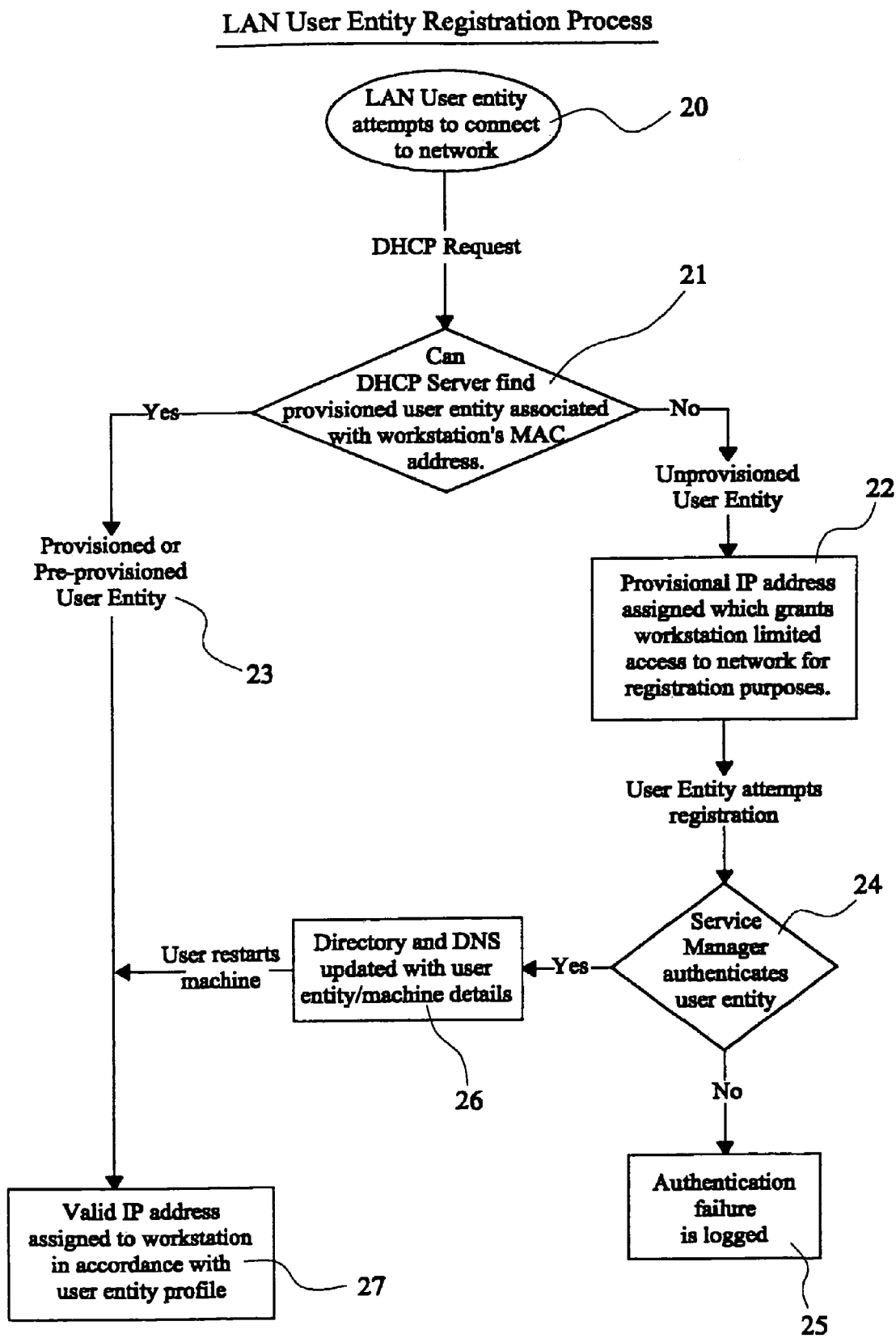
FIG. 4 is a flow chart which illustrates a LAN (local area network) user entity registration process using an APS of the invention.

As shown in FIG. 4, typically, every time a LAN user starts up their workstation, they must enter a user name, plus password details in order to be able to log on to their LAN. Different operating systems have different security systems for logging into a system. APS allows for a once only registration process whereby a user can log onto a system without constantly needing to re-authenticate themselves to the APS system. A user, for example an employee who starts work with and remains with an organisation for a certain period of employment can maintain their APS registration throughout their employment, without ever needing to change their service requirements. However, an employee who gains a promotion thereby needing a different level of service may wish to change their configuration, which they can do using the APS system of the invention.

Figure 6:
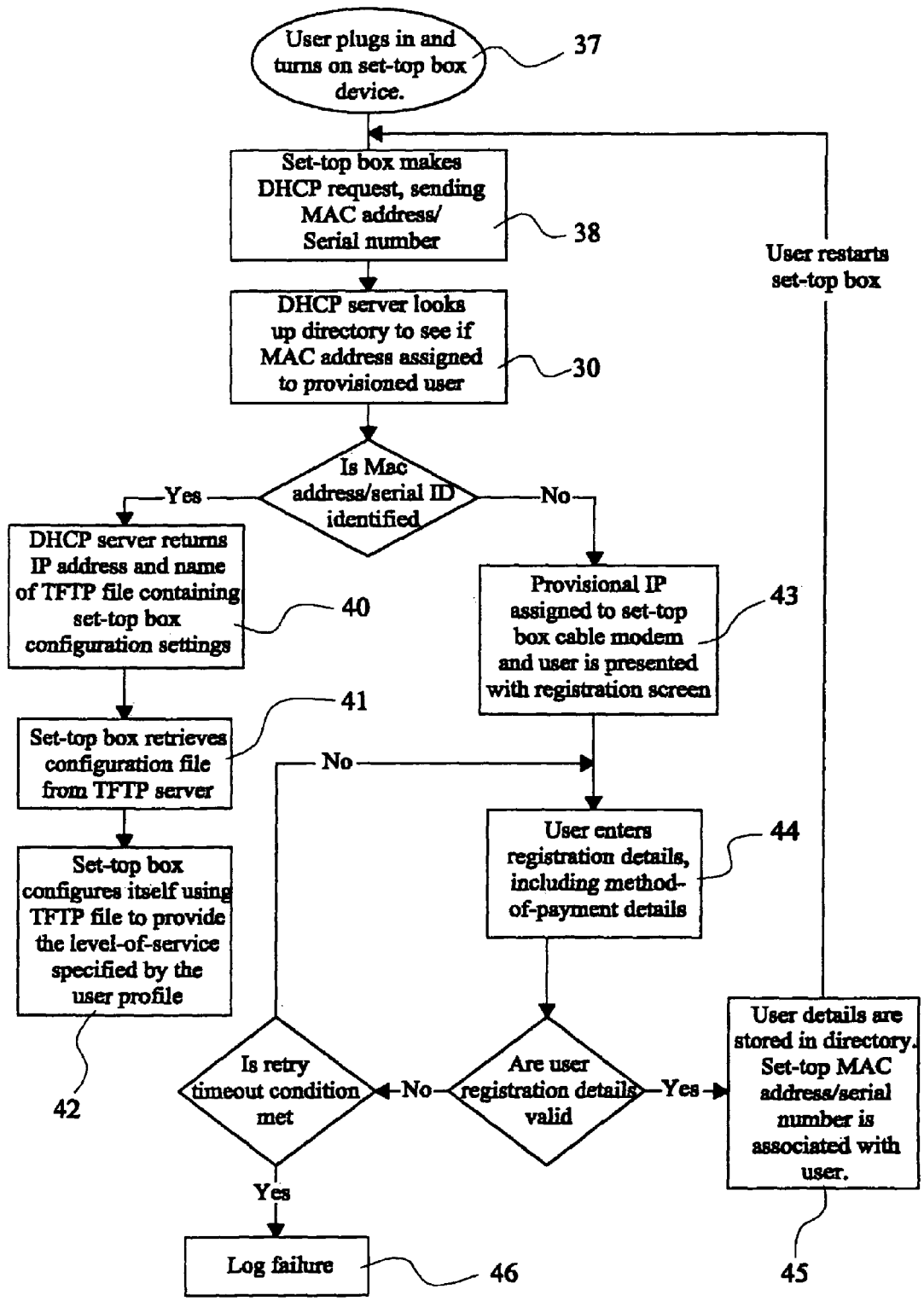
FIG. 6 is a flow chart which illustrates an automated cable subscriber self registration process using an APS of the invention.

Registration is a precursor to the provision of services and only allows an unregistered entity DNS access to the registration process itself, thereby debarring unauthorized users from accessing the network. Registration may occur without the user making any subsequent request for a service and as mentioned, may occur only once for an individual or employee who uses the same workstation and whose user entity is set to infinite. Registration may also be an ongoing process as in the case of a dial-in ISP user as shown in FIG. 6 or for an automated cable modem subscriber as shown in FIG. 6. Registration presents the availability of services, it does not translate directly into actual service requests. It is the information that is stored about an entity during the registration process that is used by the authorisation process to determine whether an entity's service request will be granted.

In the case of a LAN user registration process as shown in FIG. 4. An entity request for a service or services initiates the process of entity identification as shown in step numbered 20. The identification process attempt to determine who or what is the entity and this is done by comparing information that is part of the service request, with information that is stored in the Directory such as the LDAP/X.500 Directory, to check whether details about the entity that is making the request, are held.

If an entity logs onto the system that has never accessed the system before and no details about the entity are held on the Directory, then access to the system is denied to the entity. An entity in this case would be described as an anonymous entity. This situation may arise when a new user logs onto the network or when a new piece of network infrastructure is logged onto the network or when a new workstation is logged onto the network. Taking the case of when a new workstation is logged onto the network, the Media Access Control (MAC) address is not recognised by the DHCP server, shown by step 21 and so a provisional IP address is assigned to the workstation at step 22. The granting of a provisional IP address means that the workstation is un-provisioned and in order to gain access to any network services, the workstation must be registered by a network administrator via a registration interface.

The entity may have not ever accessed the system before but the system may be pre-configured by a network administrator to recognize the entity when they try to access the system. For example, a new employee may be due to start work in a few days time and before the employee arrives, the administrator may set up a username/password combination for that employee. When the employee logs onto the system they will be identified as being a pre-provisioned entity shown at step 23

When an entity makes a service request, the entity is recognised by the system that already has configuration details about the entity. If the entity is successfully identified as pre-provisioned and then provisioned, registration then proceeds to the authentication process using the Service Manager as shown in step 24. If the entity is still recorded as being anonymous, access may be denied to the network or alternatively will be referred to the registration interface, shown at step 25.

If the user is allowed access to the system a valid IP address will be assigned to the workstation in accordance with the user profiles as shown in step 27. The Directory and the DNS can be updated with new user entity/machine details, on a continuous basis as shown in step 26, which will allow for the valid IP address at step 27 to be updated in accordance with the requirements of the user.

Figure 5:
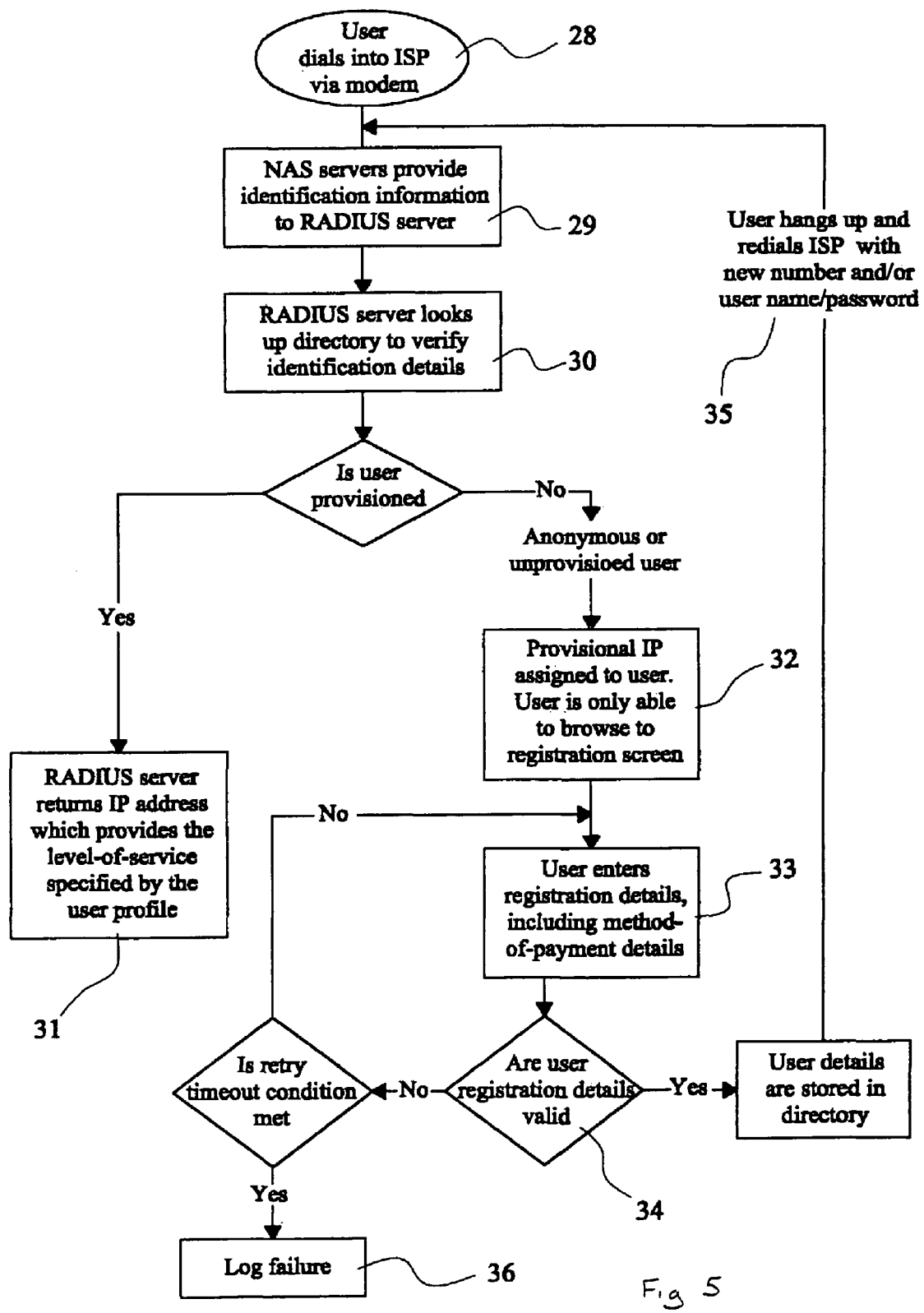
FIG. 5 is a flow chart which illustrates an automated ISP subscriber self registration process using an APS of the invention.

In FIG. 5, a similar process occurs, a user can dial into an ISP via a modem at 28. A NAS server provides identification information to a RADIUS server at 29 and the RADIUS server looks up in the Directory to verify identification details for that user at 30. If the user is provisioned, the RADIUS server will return an IP address which will provide the level of service that a user has been specified by a user profile that is held on the Directory at 31. If the user is not provisioned, a provisional IP can be assigned to the user which allows the user to browse the registration screen only 32. The user can then enter registration details, including details of how they will pay for their use of the requested services 33 and the user registration details can then be checked 34 on the Directory to see if they are valid. When the user details are stored on the Directory, the user can then redial into the system using their new number or password which allows the user to access the system with at the level of service that they have specified 35. If the registration details are not valid, the system will not allow the user access and will register that there has been a log on failure 36.

In the case of a cable modem subscriber as shown in FIG. 6, the user connects into the system via a set-top box 37. The set-top box makes the DHCP request to the DHCP server which looks in the Directory to see if MAC addresses have been assigned to a provisioned user 38. If the MAC address/serial ID of the user is identified 3, the DHCP server returns the IP address and name of the TFTP file containing set-top box configuration settings to the set-top box 40, which retrieves them from the TFTP server 41. The set-top box then configures itself using the TFTP file to provide the user with the level of service that they requested using the user profile 42. If the Mac address/serial ID is not identified, a provisional IP is assigned to the set-top box cable modem and the user is presented with a registration screen 43. The user can then enter their registration details 46 and if these are valid, user details are stored in the Directory and a set top MAC address/serial number is associated with the user 45. The user can then use the allocated MAC address/serial ID to log onto the system when they restart the set-top box. If the registration details 46 are not found to be valid a log on failure will be registered.

The authentication process attempts to verify the entities that are attempting to log onto the network. There may be two levels of authentication for example "weak authentication" where say the user name and password is checked, or "strong authentication" where say a digital certificate request is made to a smart card or a finger-print scan takes place. The level of authentication may be demanded as a function of the access method, the service requested or the geography of the user. Once an entity has been authenticated, the system then determines whether the proven entity is authorised to use the requested service.

Authorisation is an ongoing process which handles authorisation to use a service. Before delivering the requested service, the application must first receive the necessary clearance for that entity. To determine which response to make, the application assesses parameters such as the entity's base profile plus any profile extensions, the entity's network access method e.g. via a dial-in ISP request, dial-in direct to RAS request, LAN request, geographical location of the entity of the time of access. The primary parameter is the entity's profile plus any profile extensions. Authorisation will only be given if the entity has been explicitly registered to use a particular service. Provided approval is given to the application to grant a service request, the application may then proceed to the actual delivery of the service to the entity. Entity-service association is then said to be completed.

Service-infrastructure association then occurs which involves configuration of items of the infrastructure specified by the service in a way that provides the service to the requesting entity. The item, (such as the DHCP server) configures itself in a manner which is specific to that object. There are two types of infrastructure configuration, the first where use is allowed by the entity and the second where use is denied to the entity.

The APS provides user/administration interfaces for a range of functional areas such as registration, report/query, administration, IP configuration, DNS management, domain management and security management. The APS supports the creation of user interfaces using technologies such as the Browser interfaces, application interfaces and user defined interfaces. The HTML for display by the Browser is generated or stored on a web server and is served to the user via HTTP protocols. HTML is platform independent and HTTP ports are generally available through firewalls. APS support for HTML is achieved by using an HTML adaptor contained within the Story Processor that runs on the web server. The Story Processor HTML adaptor handles data submitted via and HTML interface and also delivers HTML interfaces. The Story Processor then converts requests for service from interface specific format into a generic format which is passed to the service manager layer.

Although the APS system provides for the use of standard interfaces, it is also possible for organizations to build their own interfaces or to use existing interfaces that the organisation is already using but which are adapted by the APS system of the invention. APS interfaces which may be customized are IP configurations, security management and VPD or domain management. APS interfaces which support partial customization e.g. use of company specific logos or background images on standard APS interfaces are:

HTML based VPD/domain interfaces
HTML based Registration interfaces
HTML based report/query interfaces
HTML based administration interfaces Partial interface customization is referred to as interface branding. Interface branding involves the insertion of a company brand/logo information into the HTML frame-sets as headers and/or footers. A virtual ISP may buy an ISP service from a larger ISP which uses the APS system of the invention. Assuming all the user details are stored and administered using the parent ISP's infrastructure, any virtual ISP subscriber wishing to check details such as account details, would use the parent ISP's subscriber account maintenance interface. To conceal the fact that they are using the system, the virtual ISP user could provide as part of their virtual ISP configuration, their own logos to customize the HTML interface.

APS interfaces which allow for complete replacement by a customized interface are registration interfaces and HTML based report/query interfaces. The mechanism that allows for organizations to build their own interfaces are the same programming Application Programming Interfaces (API's) that can be invoked by standard APS user interfaces and these include Service Manager API's and Story Processor Adaptor API's. For example, an organization may wish to publish their own registration interface using HTML or multiple HTML pages to collect registration details. Once the user has traversed the HTML pages (stories) the data is posted to the HTML adaptor which translates the data into an object to pass the Service Manager.

APS interfaces can provide interface security to media such as public networks or insecure private networks. The APS system does not assume that standard security implementations such as firewalls are fully secure and implements its own security model to provide measures of security required. Security measures that may be required are data confidentiality, data integrity, authentication and non-repudiation.

The APS implements security measures using Secure Sockets Layers (SSL) which secure transmissions over networks and create secure socket connections between a user and a server. SSL supports multiple cryptographic techniques for example, RC2 or RC4 encryption with a 40-bit key, RC4 encryption with a 128-bit key and a MD5 MAC, triple DES encryption with a 168-bit key and a SHA-1 MAC, RC2 and RC4 encryption with a 40-bit key and a MD5 MAC and no encryption with an MD5 MAC.

The APS allows the administrators to select the type of security appropriate for an information exchange, for example whether credit card details are to be acquired for a user or whether data integrity is important. Further, different levels of security may be provided for according to the entity type, access method, service requested or the geography of the user. For example, a mobile employee connecting to a LAN from abroad would require greater authentication to use a network than an internal employee who is connecting directly to the LAN. Selection of the type of security has system performance implications in terms of CPU processing, public key cryptography and for example, 3-way CHAP authentication involves more network traffic than 2-way PAP.

The APS system of the invention gives the APS administrator the flexibility to select the security technique that is appropriate to the performance of the system.

Figure 7:
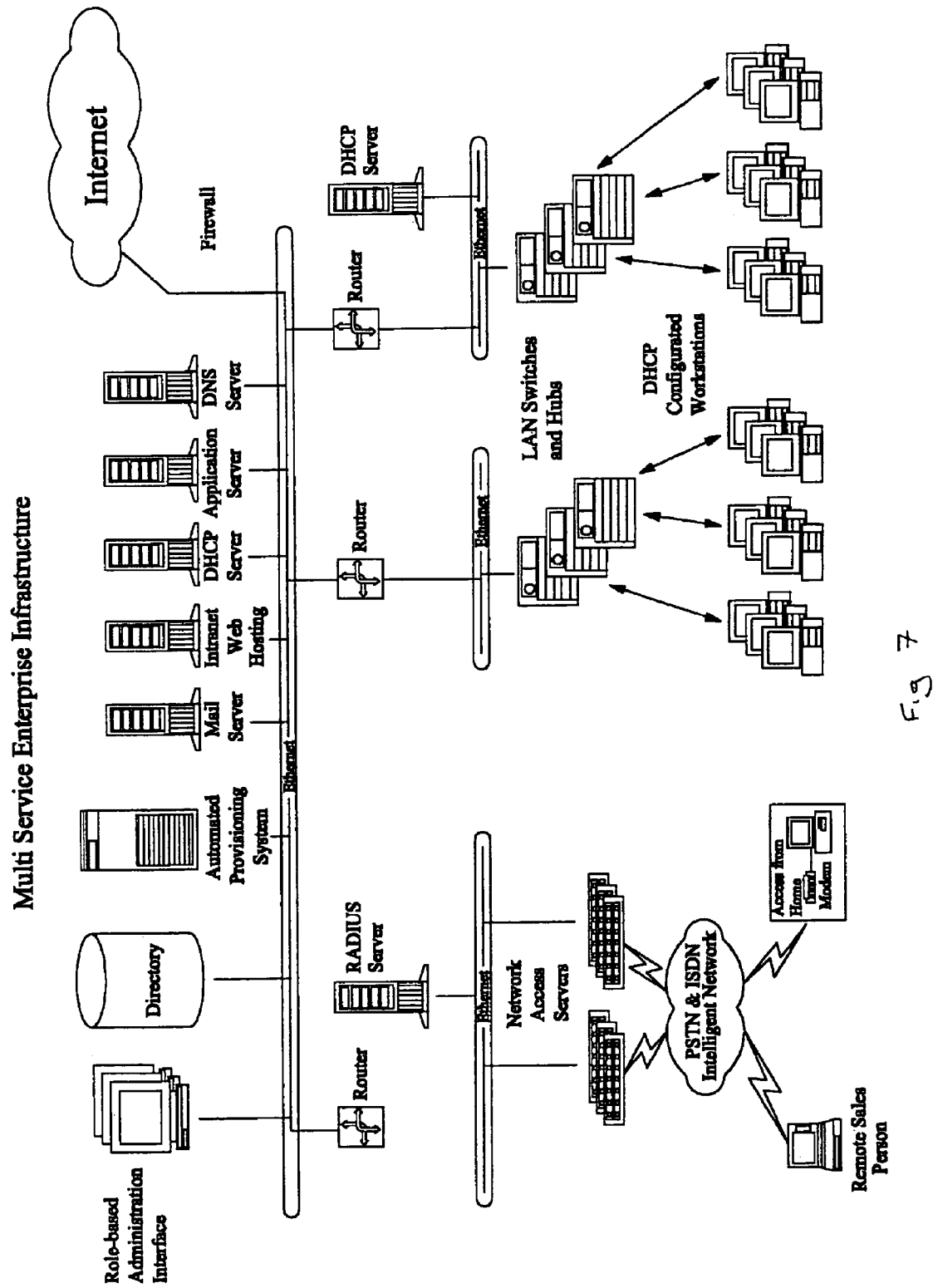
FIG. 7 shows an APS system of an embodiment of the invention being used with a multi service enterprise infrastructure.

FIG. 7 shows a schematic figure of a multi service enterprise structure in which the APS system uses the directory to link a plurality of DHCP configured workstations which are in turn linked to a number of servers, including a mail server, Internet server and application server.

Figure 8:
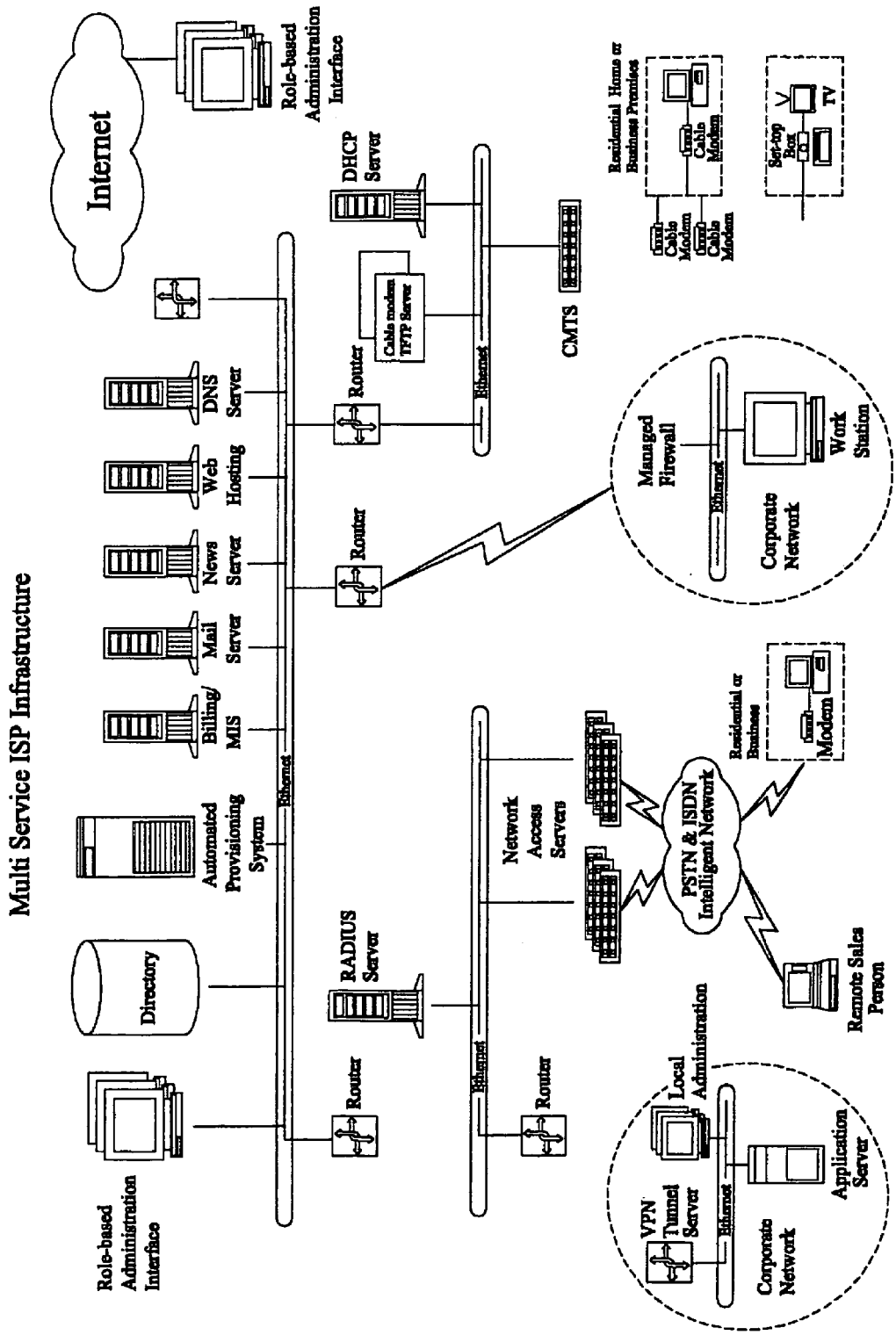
FIG. 8 shows an APS system of an embodiment of the invention being used with a multi service Internet service provider infrastructure.

FIG. 8 shows a schematic figure which is similar to that shown in FIG. 8 except that it shows a multi service ISP infrastructure. Rather than having a number of DHCP configured workstations as shown in FIG. 7, FIG. 8 shows a system where individuals can have access via a modem, cable modem or set top box, corporate firewall or VPN to the APS controlled system.

The invention claimed is:

1. An automated provisioning system embodied on hardware memory for enabling activation of users and services in a distributed electronic system, which provisioning system is adapted to use an LDAP or X.500 compatible directory enabled information repository comprising one or more directories;

the system further comprising a service manager interfacing with the information repository and components of the distributed electronic system, and the information repository comprises a scalable data model; and the service manager is adapted to log on to a directory and interacts therewith to create, delete, amend or search for information in the information repository, wherein the service manager interacts, through a plurality of interfaces, with components and users of the distributed electronic system to enable authentication and authorization to use services running on the components such that the services can be activated;

wherein each of the services is assigned to at least one of a plurality of profiles;

wherein each of the users is assigned to at least one of the plurality of profiles;

wherein the users are authorized by the service manager to use the services based on the plurality of profiles, such that for a particular one of the plurality of profiles assigned to a particular one of the services, a plurality of the users assigned to the particular one of the profiles are authorized to use the particular one of the services;

wherein for each of the profiles, configuration objects are utilized such that user to service configuration objects collate user service attributes provided by the profile which represent user specific parameters including a username and password, profile to service configuration objects for the profile allow the user assigned to the profile to access specific service parameters, and a service to infrastructure configuration object is utilized to find one of the services that is required by the user assigned to the profile;

wherein the users are authorized by the service manager to use the services based on the plurality of profiles such that services are assigned to the users via the profiles and are prevented from being directly assigned to the users.

2. An automated provisioning system according to claim 1, wherein the data model comprises domains, users, services, profiles and infrastructure.

3. An automated provisioning system according to claim 1, wherein a subscriber uses an automated on-line subscriber self-registration system to subscribe to new services, or to modify or unsubscribe from existing services via a user interface, in which the user interface interacts with the service manager.

4. An automated provisioning system according to claim 3 for use in a cable TV system, wherein the system permits subscription to a multitude of services.

5. An automated provisioning system according to claim 2, wherein components available to one of the users are assigned to at least one of the plurality of profiles to which the one of the users is assigned.

6. An automated provisioning system according to claim 1 wherein for each of the profiles, the profile comprises a base profile, which base profile describes the core characteristics of each of the users to which the profile is assigned.

7. An automated provisioning system according to claim 6, in which the profile further comprises an extension profile, which extension profile represents refinements to services available to each of the users to which the profile is assigned.

8. An automated provisioning system according to claim 7 in which the profile comprises a combination of one or more base profiles and extension profiles.

9. An automated provisioning system according to claim 1, in which the system provides a trigger mechanism for the creation, deletion or modification of information outside of the directory server thus enabling information distribution to billing systems, databases and workflow management.

10. An automated provisioning system according to claim 1, wherein requests, initiated via a plurality of user interfaces served by a plurality of servers, are made to the service manager by the plurality of servers.

11. An automated provisioning system according to claim 10, wherein the system comprises a plurality of object request brokers and a plurality of service managers.

12. An automated provisioning system according to claim 3, wherein the user interfaces comprise web interfaces adapted to use servlets to create a separate thread of execution for each individual request.

13. An automated provisioning system according to claim 1, wherein the system is provided with a directory communication layer adapted to enable the service manager to work with multiple directories.

14. An automated provisioning system according to claim 1, wherein the service manager permits abstraction of the services away from the infrastructure of the distributed electronic system.

* * * * *